(12) United States Patent
Svendsen

(10) Patent No.: US 8,990,473 B2
(45) Date of Patent: Mar. 24, 2015

(54) MANAGING REQUESTS TO OPEN AND CLOSED BANKS IN A MEMORY SYSTEM

(71) Applicant: Applied Micro Circuits Corporation, Sunnyvale, CA (US)

(72) Inventor: Kjeld Svendsen, Sunnyvale, CA (US)

(73) Assignee: Applied Micro Circuits Corporation, Sunnyvale, CA (US)

( * ) Notice: Subject to any disclaimer, the term of this patent is extended or adjusted under 35 U.S.C. 154(b) by 146 days.

(21) Appl. No.: 13/644,924

(22) Filed: Oct. 4, 2012

(65) Prior Publication Data

US 2014/0101380 A1  Apr. 10, 2014

(51) Int. Cl.
*G06F 13/16* (2006.01)

(52) U.S. Cl.
CPC ........ *G06F 13/1626* (2013.01); *G06F 13/1642* (2013.01)
USPC .............................................. 711/5; 711/156

(58) Field of Classification Search
CPC combination set(s) only.
See application file for complete search history.

(56) References Cited

U.S. PATENT DOCUMENTS

| | | | |
|---|---|---|---|
| 5,323,489 A * | 6/1994 | Bird ............................... | 711/167 |
| 6,549,991 B1 * | 4/2003 | Huang et al. .................. | 711/158 |
| 6,591,349 B1 * | 7/2003 | Steinman et al. ............. | 711/154 |
| 6,647,456 B1 * | 11/2003 | Van Dyke et al. ............ | 711/169 |
| 6,662,265 B1 * | 12/2003 | Kessler et al. ................. | 711/105 |
| 7,076,617 B2 * | 7/2006 | Dodd ............................ | 711/156 |
| 2003/0033493 A1 * | 2/2003 | Cismas ......................... | 711/158 |
| 2009/0013108 A1 | 1/2009 | Rajamani | |
| 2009/0055570 A1 * | 2/2009 | Madrid et al. ..................... | 711/5 |
| 2009/0327596 A1 | 12/2009 | Christenson et al. | |
| 2010/0281231 A1 * | 11/2010 | Krishnan et al. ............. | 711/167 |
| 2011/0238941 A1 * | 9/2011 | Xu et al. ....................... | 711/169 |
| 2014/0101381 A1 * | 4/2014 | Svendsen ...................... | 711/105 |

OTHER PUBLICATIONS

DDRn Memory Interface IP, http://www.synopsys.com/IP/InterfaceIP/DDRn/Pages/default.aspx, Date accessed: Oct. 4, 2012.

* cited by examiner

*Primary Examiner* — Nathan Sadler
(74) *Attorney, Agent, or Firm* — Amin, Turocy & Watson, LLP

(57) ABSTRACT

Systems and methods are provided that facilitate memory storage in a memory device. The system contains a memory controller and a memory array communicatively coupled to the memory controller. The memory controller sends commands to the memory array and the memory array writes or retrieves data contained therein based upon the command. The memory controller can monitor multiple banks and manage bank activations. Accordingly, memory access overhead can be reduced and memory devices can be more efficient.

20 Claims, 10 Drawing Sheets

MANAGING REQUESTS TO OPEN AND CLOSED BANKS IN A MEMORY SYSTEM

FIELD

This disclosure relates to memory management in memory systems, and more particularly to cost efficient management of multi-bank memory systems.

BACKGROUND

In multi-bank memory systems, a memory controller connects to a memory device and a microprocessor. A microprocessor sends requests to the memory controller and a memory controller processes requests to access a bank storing data in a memory device. In this way, a memory controller acts as a liaison between a microprocessor and a memory device.

A memory controller may connect with multiple microprocessors and multiple memory devices. Likewise, a microprocessor may connect with multiple memory controllers. For example, a memory controller can connect to one or more dual in-line memory modules (DIMMs) via a set of buses and each DIMM can contain multiple dynamic random access memory (DRAM) devices. In some devices, a microprocessor couples to multiple memory controllers and each memory controller couples to multiple memory devices. A memory controller manages each memory device coupled to the memory controller.

Many memory devices, such as a DRAM device, contain one or more arrays of storage elements organized into ranks, banks, pages, rows and columns. Each rank of memory is a set of one or more DRAM devices that operate in lockstep in response to a command. A bank is a number of independent DRAM arrays within a DRAM device. Thus, each rank can comprise a number of banks and each bank can contain a number of pages. At the lowest level, pages are organized in rows and columns.

Every access to memory uses a certain amount of power and time or latency. Upon receiving a request, a corresponding rank and bank must be determined. From there, the row and certain columns within the bank are selected to perform a read or write operation. To access a memory device, memory controllers process an address of memory to identify the rank, bank, page, row and column of an appropriate memory device. Once identified, a bank must be opened, or pre-charged, and page must be activated before data is sent or received into memory.

Additionally, memory controllers send data and commands to memory devices via bus lines. Bus lines are also used to carry information in response to commands back to a memory controller. Generally, the full width of a bus line is not consistently used during memory accesses.

In the past, read and write operations in typical memories took place only on the rising or falling edge of a clock signal. Today, many devices utilize double data rate (DDR) memories. DDR memories are read and written both on rising edges and on falling edges of a clock signal. This allows DDR memories to double the data rate.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular implementations of the specification, or any scope of the claims. Its purpose is to present some concepts of the specification in a simplified form as a prelude to the more detailed description that is presented in this disclosure.

In an implementation, a processing unit, such as a central processing unit (CPU), microprocessor, non-transitory signal processor, or other device sends a request or a series of requests to a memory controller. Each request is typically in the form of a read or write request. Requests are stored in one or more request queues until they are processed. A scheduler coupled to the one or more request queues can schedule the order, timing and processing of requests to a memory storage device, such as a DDRX, wherein X is an integer denoting a generation (e.g., DDR, DDR2, DDR3, DDR4, etc.), optical storage devices, volatile memory devices, mechanical storage devices, magnetic disk drive, solid state disks (SSD) floppy disk drives, tape drive, Zip drives, LS-100 drives, flash memory cards, or memory sticks, for example. The memory storage device contains a number of addressable banks and each bank contains a number of pages. Requests are sent to specific rows and columns within a bank. Before a request is processed, the bank and page must be opened (pre-charged) and ready for access. A bank page manager can monitor and track activation statuses of bank pages. In one aspect, a bank status is either open or closed. In another aspect, a bank status can include a number of fields, such as, but not limited to, the amount of requests waiting service, the amount of requests all ready serviced, and/or the length of time requests have been pending but not serviced. In one example, a single bank page manager can monitor an entire memory system. In another example, multiple bank page managers can simultaneously monitor multiple memory devices.

In one implementation, a bank page manager consists of one or more tables closely coupled to other components within a memory system, such as a scheduler and/or column switch (CSW), for example. Tables within the bank page manager can be accessed by a number of components. In another implementation, a scheduler utilizes tables within the bank page to schedule requests. Accordingly, latency associated with memory access can be decreased, bandwidth associated with memory access can be increased, overhead can be reduced, power consumption can be reduced, area can be reduced and/or other aspects of efficiency can be increased. In another aspect, a large number of multi-bank memory devices can be efficiently managed according to aspects of this disclosure.

In one implementation, a bank page manager can include a bank open table and a scheduled open table. The bank open table can monitor and keep a list of open banks while the scheduled open table can monitor and keep a list of unopened banks for which a request has been made or scheduled. In another aspect, the bank open table and the scheduled open table can be accessed and updated in parallel by a CSW request and scheduler.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, implementations, and advantages of the present invention will be apparent upon consideration of the following detailed description, taken in conjunction with the accompanying drawings, in which like reference characters refer to like parts throughout, and in which.

DETAILED DESCRIPTION

Figure 1:
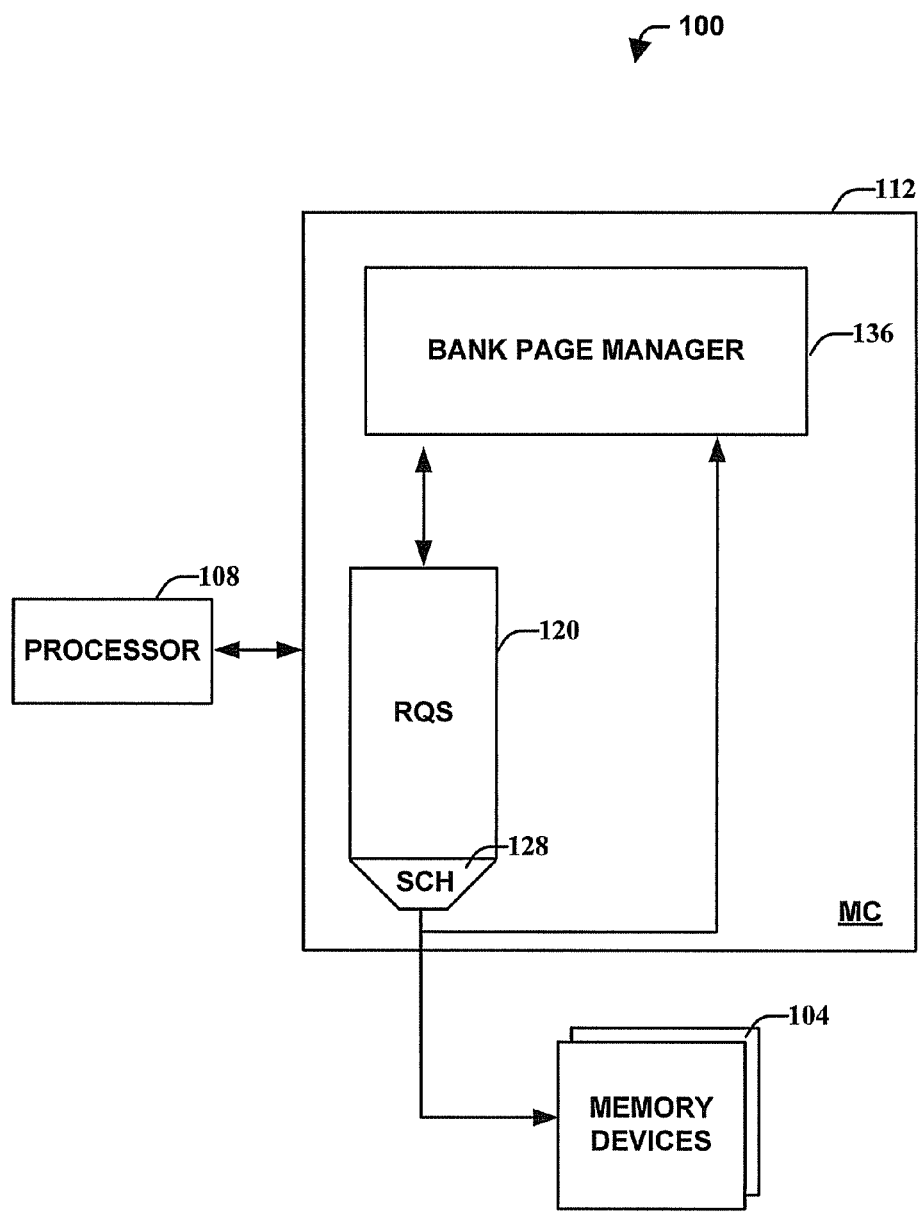
FIG. 1 illustrates a high-level functional block diagram of an example memory system in accordance with various aspects of this disclosure.

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of disclosure may be practiced without these specific details, or with other methods, components, materials, etc. In other instances, well-known structures and devices are shown in block diagram form to facilitate describing this disclosure.

Systems and methods disclosed herein relate to access and management of memory in a multi-banked memory device. In one implementation, a memory system monitors open banks and memory access requests to efficiently manage and access memory banks. It is appreciated that a memory system can be within larger devices such as smart phones, tablets, e-readers, digital video recorders, mobile music players, personal computers, servers, memory sticks, digital video recorders (DVRs), solid state machines, consumer electronics and the like.

Electronic memory systems, in accordance with various aspects of this disclosure, benefit from lower latency for memory access and lower power consumption. Opening bank pages can reduce overhead if pages are opened ahead of time, according to an identified pattern. Further, power consumption can be reduced by opening bank pages in an efficient manner. It is appreciated that memory devices are capable of utilizing various timing, or clock signals. Accordingly, one of ordinary skill will appreciate various timing constraints associated with various applicable types of memory (SDRAM, LLDRAM, DRAM, etc.) as timing constraints and signals are inherent to the various systems and/or methods described below and may not be included for brevity.

According to one aspect of this disclosure, a processing unit(s) issues requests to a memory system (e.g. read and write requests). The memory system processes the requests and can return data to the processing unit. In use, the memory system may serve a plurality of successive requests. Requests are specific to pages within a bank of memory. Accordingly, the memory system must activate closed bank pages in a memory device before accessing rows and columns within the closed bank pages. Accesses to the memory device may need to switch between banks, and between pages within banks. Each switch can result in power consumption and latency. The bank page manager can monitor future, present and past requests to create statistical information, including but not limited bank and page activation status, serviced write requests to a page and bank, write requested pending but not yet serviced to a page and bank, serviced read requests to a page and bank, requested un-serviced read requests to a page and bank, and starvation data. Scheduler component(s) and CSW(s) can utilize the stored information to manage memory accesses and schedule requests.

In one implementation, a memory system is contained within a server device. The server device is connected with a number of other devices, such as client devices and other server devices. The sever device manages requests and communication with the other devices. The memory system within the server can monitor and manage memory access. The memory system can schedule memory requests and access according to a scheduling scheme, such as to reduce bank conflicts, for example.

In this disclosure, various systems and methods are described. Generally, this disclosure will refer to predicting patterns of access to and opening banks. It is appreciated that the various systems and methods can be applied to bank pages, rows and columns. However, for clarity and brevity, the systems and methods refer to banks in general.

Additionally, in this disclosure various systems and methods generally refer to a memory, memories, a memory device(s), a storage device(s), a memory storage device(s), or the like are generally intended to refer to a computer-related entity, either hardware (e.g., a circuit), a combination of hardware and software, and/or an entity storing data, electronically, optically, mechanically or otherwise. For example, a memory may be, but is not limited to being, an electronic memory device storing non-transitory signals via a combination of circuitry and control algorithms. Generally, the various systems and methods apply to memory devices utilizing a bank system and/or systems and methods having an overhead pertaining to a bank system. Referring now to FIG. 1, there is illustrated a non-limiting exemplary implementation of a memory system 100 that provides data storage and access in accordance with various aspects of this disclosure. The system 100 provides for storage and access of data in memory 104. Memory 104 can include one or more suitable volatile and non-volatile memory modules including but not limited to DDRX and other, various types of DRAM, for example. Processor 108 can send requests to memory controller (MC) 112, and MC 112 can receive requests. Additionally, MC 112 can send data to processor 108, and processor 108 can receive data from MC 112. In one aspect, MC 112 sends data to processor 108 in response to a request received by MC 112 from processor 108.

In FIG. 1, system 100 includes a computer processing unit 108 capable of executing various components stored in a computer readable storage medium and issuing requests to MC 112. MC 112 can include one or more request queues (RQs) 120, one or more schedulers (SCHs) 128, one or more bank page managers 136, memory 104 and processor 108. MC 112 can be coupled to memory 104 and processor 108 via a set of bus lines. The various components may be contained on one integrated circuit, or on a number of individual circuits coupled together.

In one implementation, memory 104 contains one or more ranks of memory. Each rank of memory contains a number of banks, and each bank comprises a number of pages. In most systems, one only one page may be open per bank at any time. Likewise, many memory systems are constrained in limiting the number of concurrently open banks per rank, or open banks per system as a whole (e.g. systems utilizing four active window (tFAW)). Memory 104 may comprise memories constrained by a limited number of open banks but need not, as MC 112 can manage a large number of open banks and pages.

In one implementation, memory 104 can comprise j ranks of memory, and i banks of memory, where j and i are real integers. In another embodiment, each bank of memory can comprise k pages (or arrays) of memory, each page can have f rows and g columns, where k, f and g are real numbers. For example, memory 104 can comprise eight ranks, each rank containing eight banks, each bank containing eight pages, and each page having 32 rows and 32 columns.

In another example, memory 104 can comprise removable and addable, such as DIMM chips. Memory 104 can be expanded or reduced to include more or less memory modules.

MC 112 receives a request or series of requests from processor 108 and converts the request(s) into a series of commands suitable for memory 104. RQs 120 can store requests or converted commands. For sake of brevity, this disclosure will refer to RQs storing requests. RQs 120 may be arranged in various configurations, including but not limited to generic queue pools, arranged one queue per bank, or arranged one queue per rank.

In one embodiment, RQs 120 can be a predetermined size n, where n is a real integer. For example, RQs 120 can each be a size of 32, such that each RQ stores up to 32 data entries (requests and data related to requests). In another example, RQs 120 can include a number of different components, storing a number of data fields (e.g., via Content Addressable Memories (CAMs)).

SCHs 128 schedule access to memory 104 through electrical signaling interfaces. SCHs 128 may use a number of scheduling policies such as pipelining, row-buffer-management, open-page row-buffer-management, close-page row-buffer-management, and hybrid row-buffer management, for example. Once a command is scheduled, memory controller 112 can process the command and access memory 104. Accordingly, SCHs 128 can schedule open commands to different bank pages of memory 104 according to process requests in RQs 120. In another implementation, system 100 can utilize a number of modes, such as a read mode and write mode. In such implementation, SCHs 128 can apply appropriate scheduling schemes.

Bank page managers 136 can monitor, control, and manage banks in memory 104. In one aspect, one or more bank page managers 136 can monitor, control, and manage every bank in memory system 100. In another aspect, monitoring banks in memory 104 can include storing information associated with memory banks, such as in one or more tables.

In one implementation, bank page managers 136 monitor banks in memory 104 to track which banks are open and which banks are not open. In one example, bank page managers 136 monitor requests to determine which banks of the banks in memory 136 are open and which banks are not open. In another example, bank page managers 136, communicate with memory 104 to determine if a bank page is open or is not open.

In another implementation, bank page managers 136 can monitor, control, and manage memory requests. For example, bank page managers 136 can track and record information associated with read and/or write requests and respective memory addresses (e.g., the rank, bank, and page related to a request). In one aspect, bank page managers 136 store information in one or more storage components, such as one or more tables.

In another implementation, bank page managers 136 are coupled with SCHs 128. SCHs 128 can receive and request information within bank page managers 136. In one aspect, SCHs 128 utilize bank page managers 136's monitored information to schedule memory requests. Accordingly, bandwidth can be increased and latency can be reduced compared to systems without bank page managers 136.

Figure 2:
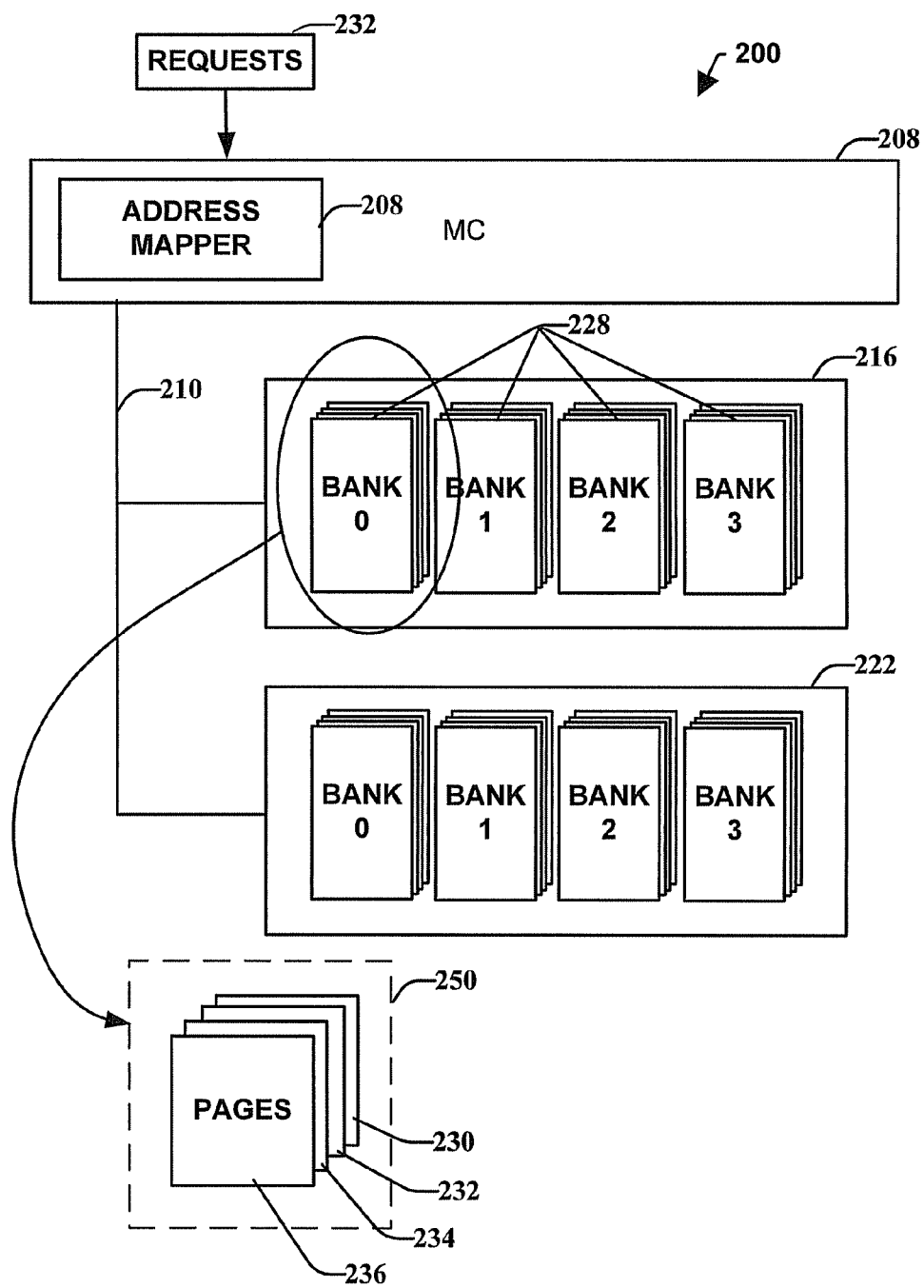
FIG. 2 illustrates a high-level functional block diagram of an example dual DIMM memory system including multiple memory banks in accordance with various aspects of this disclosure.

Turning to FIG. 2, there is illustrated a non-limiting exemplary implementation of a memory system 200 that provides data storage and data access within a memory device in accordance with various aspects of this disclosure. In FIG. 2, MC 208 comprises an address mapper 210 and various components not shown for readability. MC 208 coupled to memory rank 216 and memory rank 222 by one or more bus lines 212. Each rank consists of a number of banks. For example, rank 216 consists of four banks 228 (Bank 0, Bank 1, Bank 2, and Bank 3). Each bank 228 comprises a number of pages. Bank0 228 is shown in an expanded view 250 as containing page 230, page 232, page 234, and page 236.

While FIG. 2 illustrates two ranks (rank 216 and rank 222) each with four banks (banks 228 0-3) and each bank with four pages (e.g., page 230, page 232, page 234, and page 236), memory system 200 can comprise more or less banks and/or ranks. For example, memory system 200 could comprise q ranks consisting of p banks, and each bank can comprise t pages. q, p, and t can be any real integers, can be equal or distinct. Typically, q, p, and t are powers of two (2, 4, 8, 16, etc.) but need not be.

MC 208 receives requests 232 and translates requests into commands. For example, a processing unit may issue requests to MC 208, and MC 208 can translate the requests into commands suitable for rank 216 and rank 218. MC 208 determines which rank must be accessed, which bank of the appropriate rank must be accessed, and which page of the bank must be accessed and which row and column of the page (e.g., decodes address in request). In one aspect, address mapper 208 can decode an address in a request. Address mapper 208 can send a decoded address to one or more components in a MC 208 (e.g., RQs and/or bank page managers).

MC 208 also monitors the memory access, requests, and commands. MC 208 can track which banks and/or bank pages are open at a given time. MC 208 employs circuitry and/or components to keep statistical information regarding requests and memory access. In one aspect, MC 208 determines request scheduling based at least in part on the statistical information regarding requests and memory access. Accordingly, memory system 200 can efficiently schedule memory accesses to reduce the number of needed activation commands, switches, and power consumed.

In one implementation MC 208, can employ a set of tables to monitor and store statistical information. The set of tables can reduce overhead as well as increase efficiency compared to previous memory systems.

Figure 3:
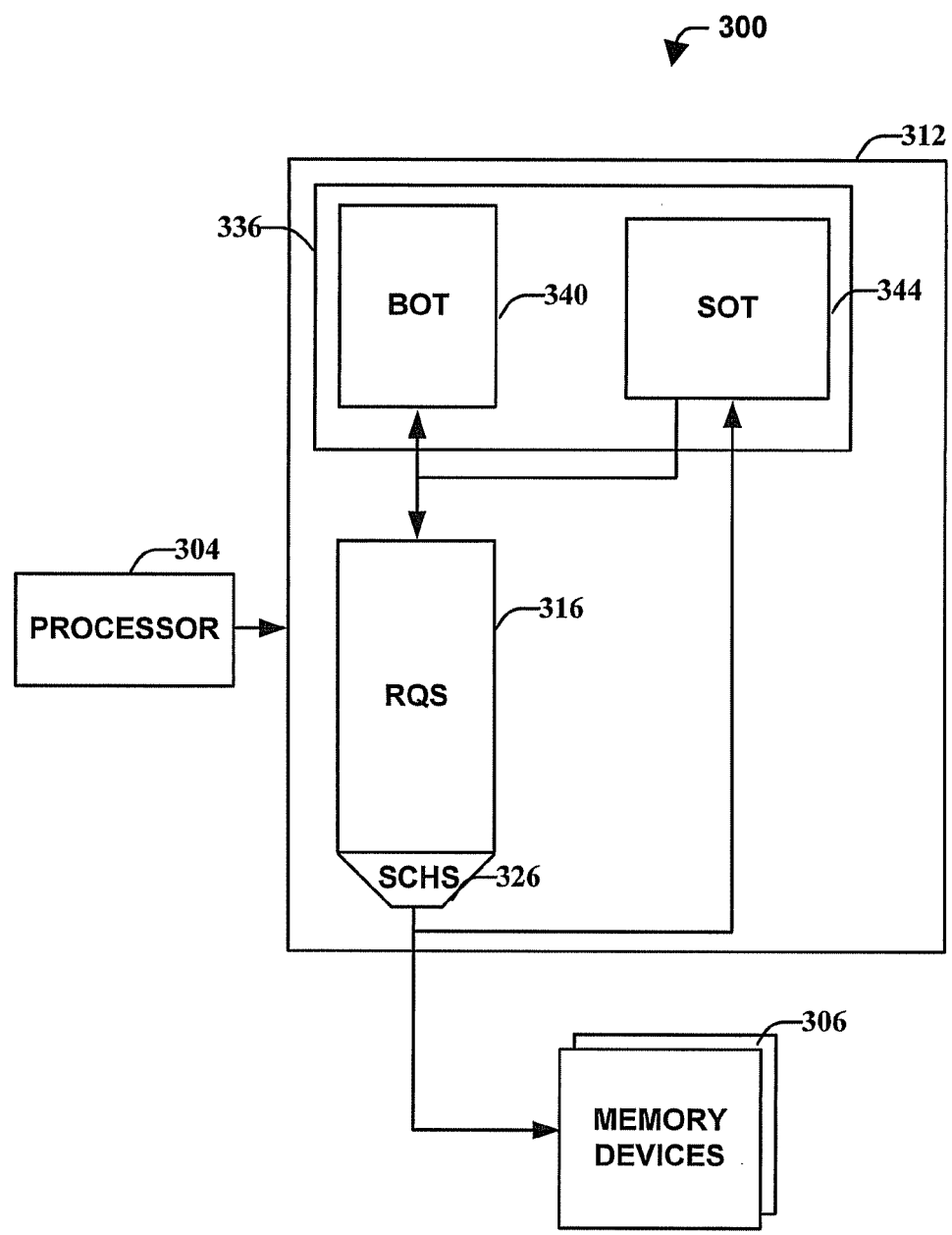
FIG. 3 illustrates a high-level functional block diagram of an example memory system, including a bank open table and scheduled open table in accordance with various aspects of this disclosure.

Referring to FIG. 3, there is illustrated a non-limiting exemplary implementation of memory system 300 that provides data access and storage management according to various aspects of this disclosure. A processor 304 or other device issues requests to MC 312 and, in some cases, sends data to be stored in memory devices 306. Memory system 300 includes a MC 312 comprising various components, including, one or more RQs 316, one or more SCHs 326, and bank page manager 336. Bank page manager 336 can contain bank open table (BOT) 340 and scheduled open table (SOT) 344.

MC 312 may include a number of components common in memory systems to accomplish tasks described herein but not shown in FIG. 3 for brevity, such as but not limited to FIFOs, MCU boards, MCB boards, buffers, bus lines, clock signals, multiplexers, interconnectors, interfaces and the like.

In one implementation, MC 312 receives requests and/or data from processor 304 via a bus line. Requests can be stored in a RQs 316. SCHs 326 can be coupled to RQs 316 and can schedule requests to be executed.

Bank page manager 336 can manage memory devices 306, requests in RQs 316, and scheduled requests by SCHs 326. In one aspect, bank page manager 336 utilizes BOT 340 to store and monitor information relating to open data banks in memory devices 306. BOT 340 can store a set of information relating to open data banks of memory devices 306. In one aspect, bank page manager 336 monitors requests and stores information regarding requests associated with open data banks in BOT 340. For example, bank page manager 336 can monitor and track information including but not limited to scheduled read requests, scheduled write requests, serviced read requests, serviced write requests, starvation, and bank conflicts.

In another aspect, bank page manager can utilize SOT 344 to store and monitor information relating to not open banks in memory devices 306. SOT 344 can store and monitor information relating to not open banks, such as, but not limited to, the number of scheduled requests to not open banks, and the number of scheduled requests to not open bank pages.

SCHs 326 communicate with BOT 340 and SOT 344. Communication can be accomplished via one or more busses. The one or more busses allow SCHs 326 to retrieve information which BOT 340 and SOT 344 monitor and control. SCHs 326 utilize the information to schedule requests. In one aspect, SCHs 326 can utilize the information to schedule memory accesses such that bank accesses require less activation commands. A decreased number of activation commands can result in decreased power consumption, decreased latency and improved overall efficiency compared to previous systems.

Figure 4:
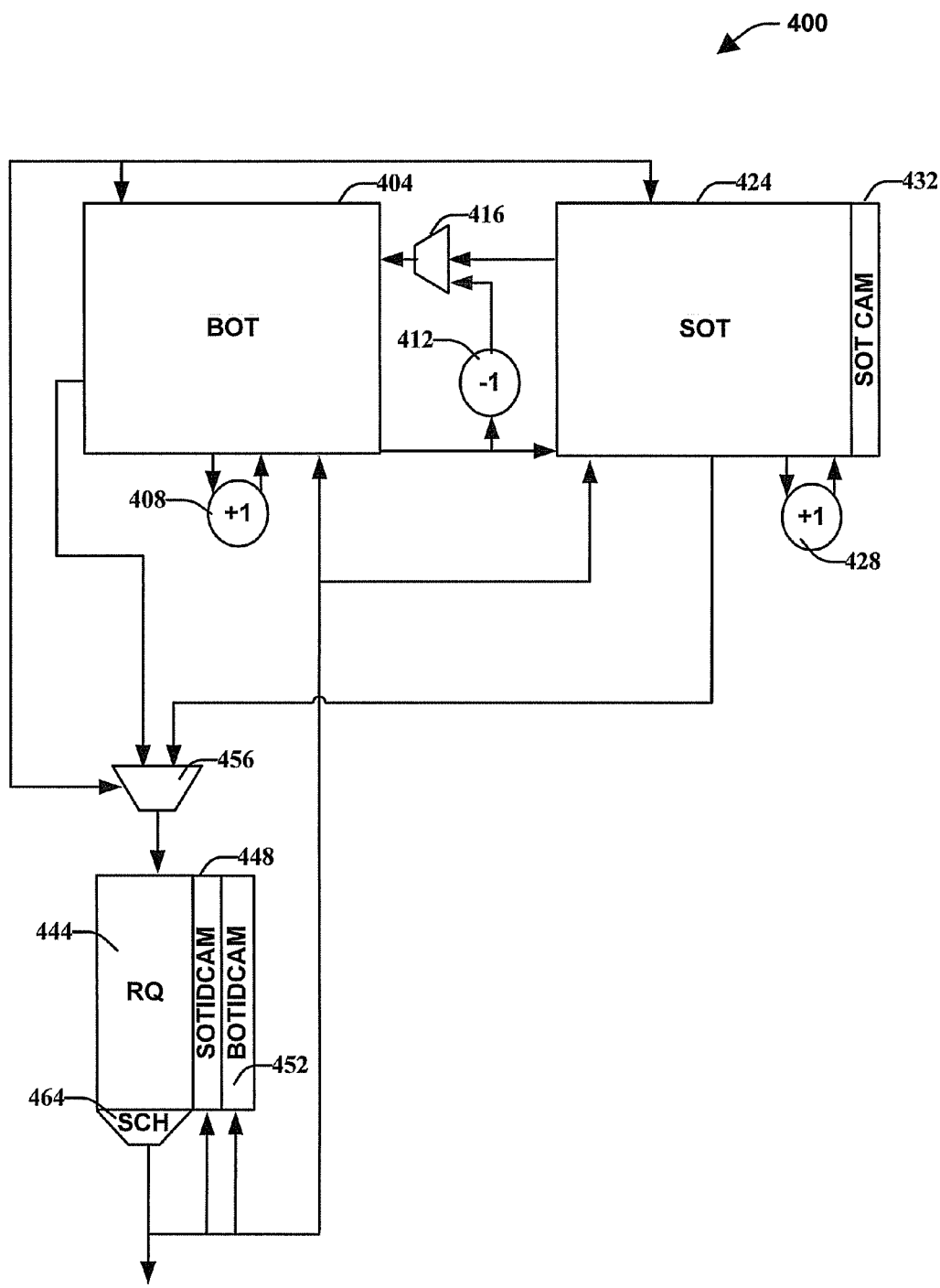
FIG. 4 illustrates an schematic diagram of an example memory system including a bank open table and scheduled open table in accordance with various aspects of this disclosure.

Turning now to FIG. 4, there is illustrated a non-limiting exemplary implementation of a memory system 400 that provides for memory management, according to an aspect of this disclosure. Memory system 400 includes various components in communication with each other, such as on one or more coupled integrated circuits. It is to be appreciated that memory system 400 can contain various other components not shown here for brevity. Memory system 400 shows a more detailed view of a portion of a larger memory management system. More specifically, memory system 400 depicts communication and functionality related to BOT 404, SOT 424, RQ 444, SCH 464 and CSW 484.

Memory system 400's components include BOT 404, SOT 424, RQ 444, SCH 464, CSW 484, incrementer 408, decrementer 412, multiplexer 416, incrementor 428, SOT CAM 432, SOTID CAM 448, BOTID CAM 452, and multiplexer 456.

RQ 444 can contain a set of requests to be executed. SCH 464 can schedule requests to access a memory device (e.g., memory device 306). In one aspect, SCH 464 utilizes BOT 404 and SOT 424 to schedule requests.

BOT 404 can manage and monitor a set of requests associated with a set of open memory banks in a memory device. BOT 404 can store a set of entries related to the monitored requests and open memory banks. In one implementation, BOT 404 creates a unique BOT identification marker (BOTID) for each entry. A BOTID can identify the open rank and bank, or the open rank, bank and page. A BOTID can be used to identify an entry with a set of information such as the current open page of a bank, the number of read and/or write requests issued and not yet serviced to the open bank (or bank page), and/or the number read and/or write of requests serviced to the open bank (or bank page), for example.

In one implementation, RQ 444 can CAM BOTIDs. RQ 444 can identify a BOTID and associate the BOTID with an appropriate request. RQ 444 and SCH 464 can send information to BOT 404 to update fields in entries associated with the BOTID as requests are processed. In one aspect, processing includes storing, receiving, scheduling, and are servicing requests.

SOT 424 can manage and monitor a set of requests associated with a set of not memory banks in a memory device. SOT 424 can store a set of entries related to the monitored requests and not open memory banks. In one implementation, SOT 424 creates a unique SOT identification marker (SOTID) for each entry. A SOTID can identify closed banks and/or bank pages. A SOTID can be used to identify an entry with a set of information such as the number of read and/or write requests issued and not yet serviced to the not open bank (or bank page), for example.

In one implementation, RQ 444 can store a set of requests marked as either BOT or SOT requests. SCH 464 can schedule the set of requests. SCH 464 can communicate with BOT 404 and SOT 424 to schedule requests. In one implementation, SCH 464 sends a signal to BOT 404 to check if a bank page is open for a BOT marked request and, in comparison, sends a signal to SOT 424 for a SOT marked requests to check if the bank page is not open. The sent signal to either BOT 404 or SOT 424 can contain an identifying signal (addressable signal) and a request type indicator (e.g., read or write). BOT 404 can update statistical data via incrementor 408, decrementor 412 and received signals from SCH 464. Likewise, SOT 424 can update statistical data via incrementor 428 and received signals sent from SCH 464.

In another aspect, entries in SOT 424 can be moved to BOT 404 when a bank corresponding to SOT 424 is opened. For example, SOT 424 can send data to BOT 404 into multiplexer 416. Multiplexer 416 can choose a signal from either BOT 404 or SOT 424 and SOT 424 can remove an entry from storage. Likewise, entries in the SOTID CAM 448, BOTID CAM 452, and RQ 444 can be updated. In another aspect, SOT 424 can maintain a free list associated with not used entry positions in SOT 424.

In another aspect, entries in BOT 424 can be removed once a bank is no longer open. For example, a bank may be closed to process a request to a disparate bank. Accordingly, a BOT 404 entry with outstanding requests not yet served can be transferred to SOT 424 and appropriate fields in SOTID CAM 448, BOTID CAM 452, and RQ 444 can be updated.

In one implementation, BOT 404 and SOT 424 can each send signals to RQ 444 passing through multiplexer 456. Multiplexer 456 can choose between multiple signals and pass an appropriate signal to RQ 444.

While memory system 400 has been described with two tables, it is appreciated that systems employing one or more tables are contemplated. Likewise, systems tracking measurable statistical information relating to memory access are contemplated and included in this disclosure. For readability, some memory system access ports, busses, circuitry and components are not shown but are inherent in system 400.

Figure 5:
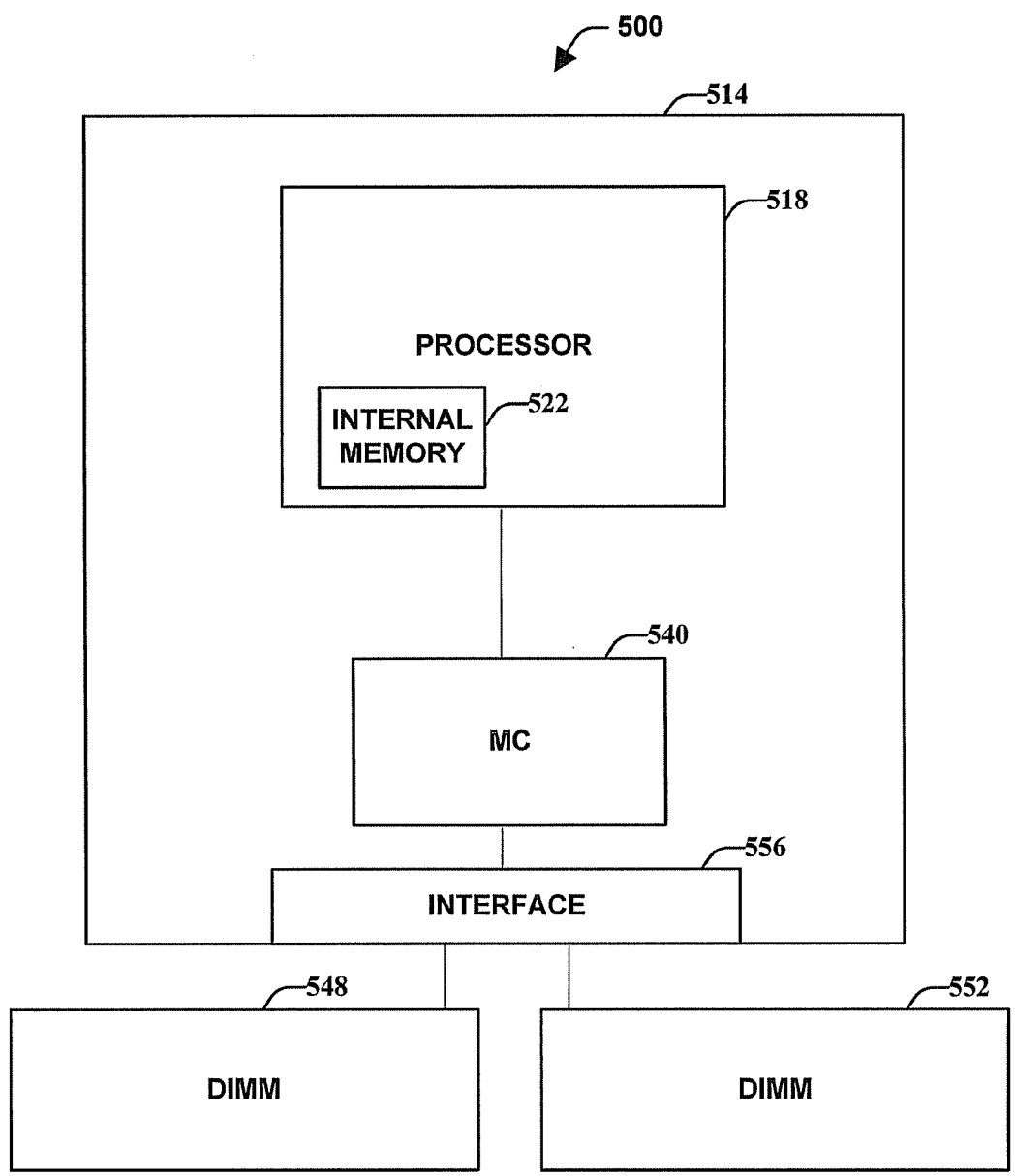
FIG. 5 illustrates a high-level functional block diagram of an example memory system, including a processor in accordance with various aspects of this disclosure.

FIG. 5 shows an example memory system 500 that provides for memory management, according to an aspect of this disclosure. In this embodiment, the system 500 comprises an integrated circuit 514 (e.g., integrated circuit 514 on a line card). The integrated circuit 514 comprises a processor 518 having an internal memory 522. The processor 518 interacts with a MC 540 on the integrated circuit 514. Memory controller 540 communicates with DIMM 548 and DIMM 552 via an interface 556. The MC 540 is a MC in accordance with various aspects of this disclosure.

The system 500 is simplified for clarity and readability. It is to be appreciated, however, that the processing system may comprise a router or switch which includes multiple such line cards, and that each line card may include multiple integrated circuits. Similar implementations of the invention may be based on one or more port cards of a router or switch.

Processor 518, implemented as at least a portion of the integrated circuit 514, may comprise a network processor. As indicated above, the MC 540 is well-suited for use in memory applications in which there is a plurality of memory banks, (e.g., DRAM, SDRAM, DDRX). In this implementation, MC 540 can manage bank and page activations employing multiple tables, for example.

Figure 6:
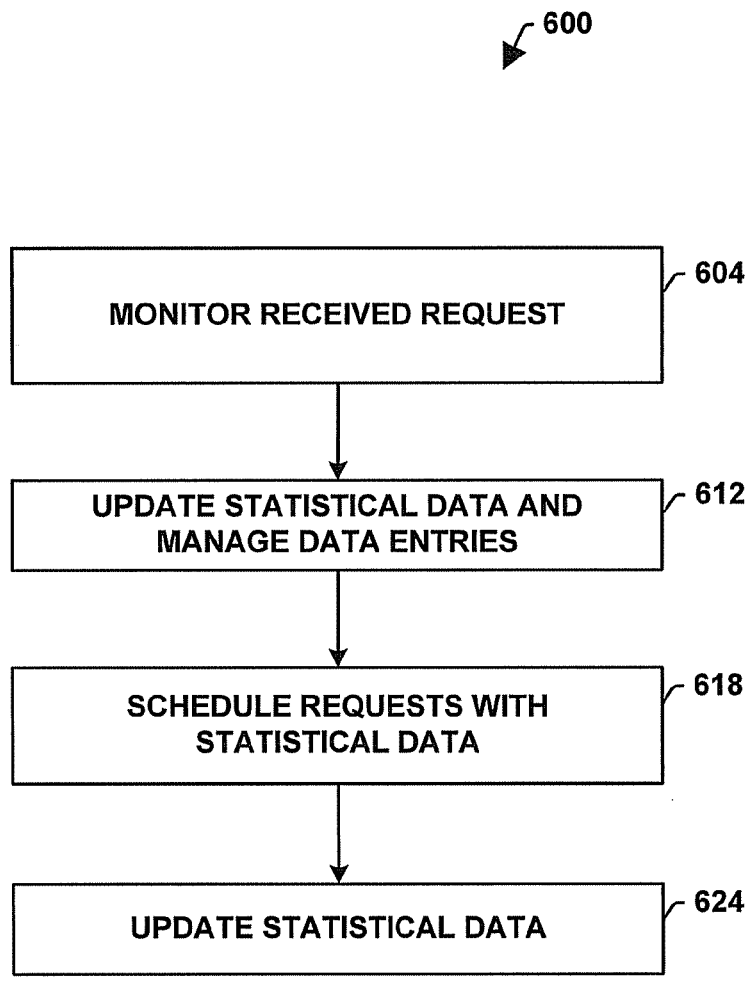
FIG. 6 illustrates an example methodology for managing memory access requests in accordance with various aspects of this disclosure.
Figure 7:
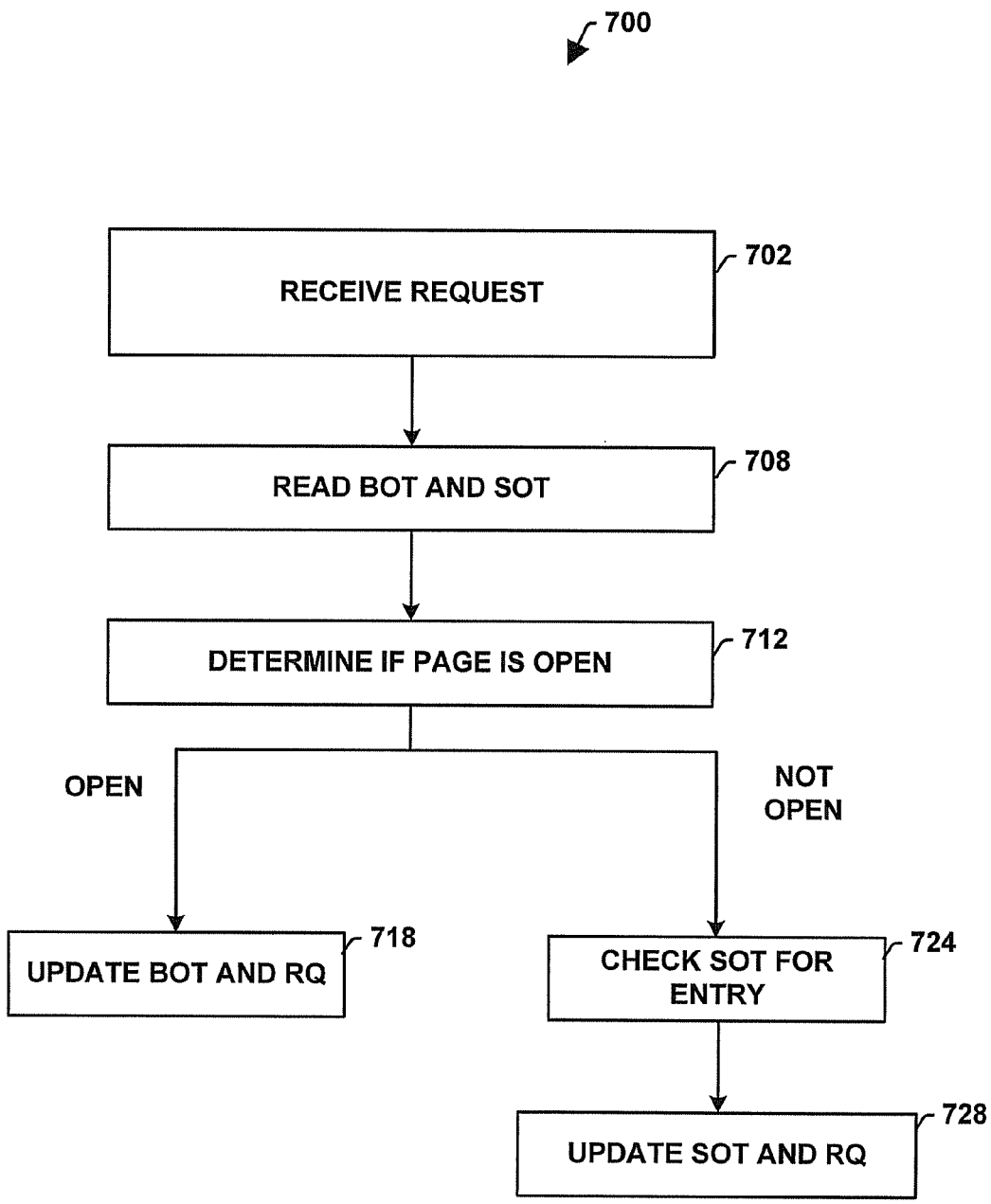
FIG. 7 illustrates an example methodology for managing memory access requests upon receiving requests in accordance with various aspects of this disclosure.
Figure 8:
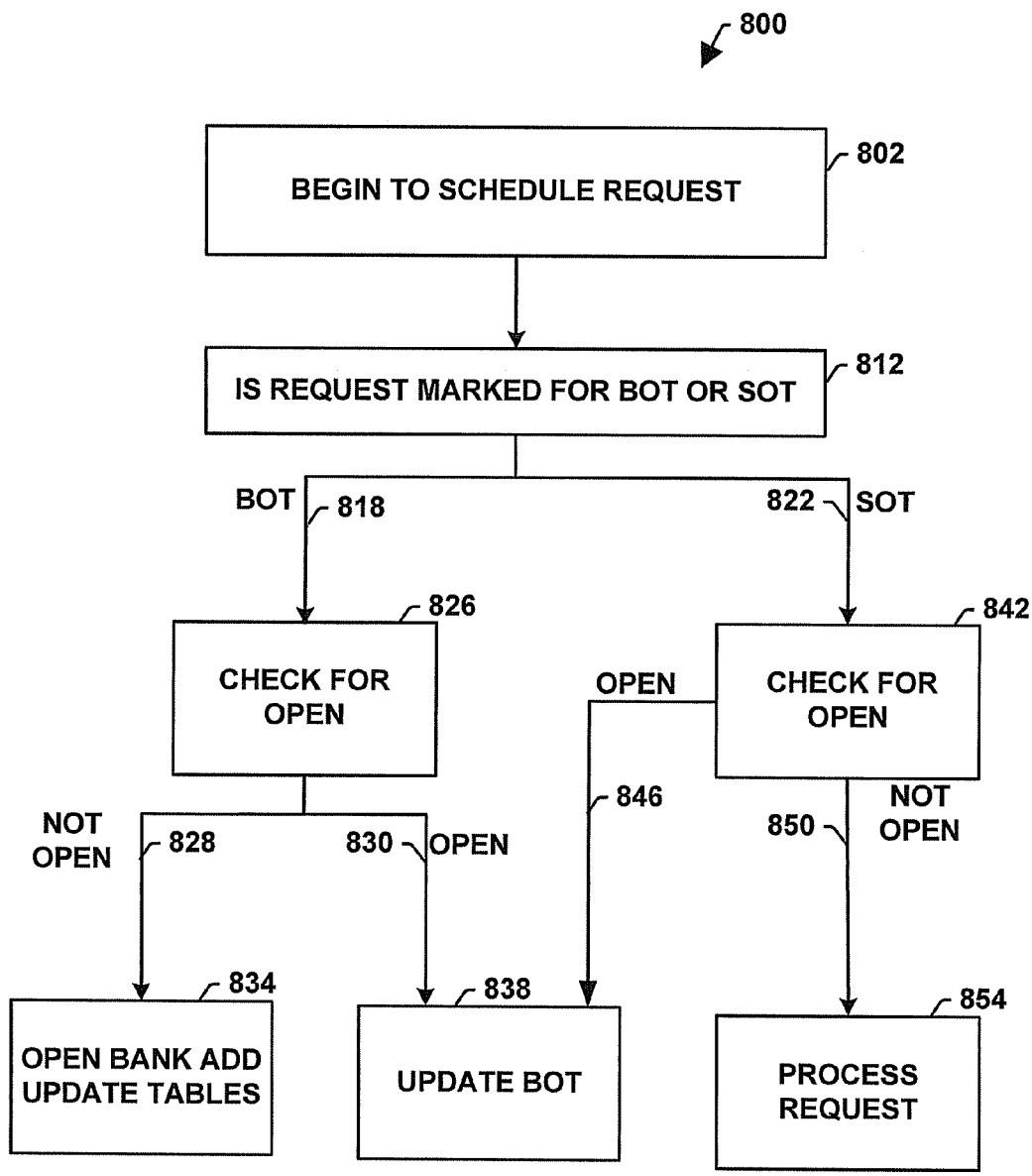
FIG. 8 illustrates an example methodology for managing memory access requests upon beginning to schedule a request accordance with various aspects of this disclosure.

Referring now to FIGS. 6-8, there are illustrated methodologies and/or flow diagrams in accordance with the disclosed subject matter. For simplicity of explanation, the methodologies are depicted and described as a series of acts. However, acts in accordance with this disclosure can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer readable device or storage medium, integrated circuits containing various electrical components, and electronic devices.

With reference to FIG. 6, there is illustrated a methodology 600 for managing a memory device upon receiving a request, according to an aspect of this disclosure. As an example, various electronic devices, such as, but not limited to, memory storage systems, server systems, personal computers, cellular phones, consumer electronic and other electronic systems can utilize methodology 600. Specifically, methodology 600 manages access to memory device(s).

A memory system monitors received memory access requests (e.g., via a bank page manager 136) at 604. For example, one or more computer processors can issue read and write commands to a memory system and the memory system can monitor the address and type of command (e.g., read or write).

At 612, a memory system can store information related to received requests and/or update previously held statistical information (e.g., via bank page manager 136). For example, a memory system can store a set of entries in a set of tables, each entry corresponding to a specific bank in a memory device and containing statistical information related to the respective bank.

Turning to 618, requests are scheduled for execution (e.g., via SCH 128 utilizing bank page manager 136). In one aspect, requests are scheduled according to a scheduling scheme. Scheduling may be based on conflict avoidance, speed maximization, power minimization, reducing overhead, and/or maximizing performance. In another aspect, scheduling can include retrieving statistical information and making a scheduling decision based, at least in part, on the statistical information. For example, requests can be scheduled to increase the number of processed requests serviced before a bank is closed.

At 624, statistical information can be updated to reflect a scheduled request (e.g., via bank page manager 136). In one aspect, statistical information regarding a bank status, a bank page status, and requests are updated. Likewise, unique identifiers may be updated in various components (e.g. BOT 404, SOT 424, and RQ 444). Accordingly, methodology 600 can increase efficiency and decrease overhead in memory systems.

With reference to FIG. 7, there is illustrated a methodology 700 for managing a memory device upon receiving a request, according to an aspect of this disclosure. As an example, various electronic devices, such as, but not limited to, memory storage systems, server systems, personal computers, cellular phones, consumer electronic and other electronic systems can utilize methodology 700. Specifically, methodology 700 updates a set of tables utilized to manage memory access in connection with a multi-bank memory storage device.

A memory system can receive one or more requests (e.g., requests sent by a computer processor and stored in one or more RQs) at 702. For example, a plurality of client devices can send requests to a server(s) through a communication framework (e.g., internet, cellular network, satellite and/or ethernet) and the server(s) can send requests to a memory system (such as memory system 100, for example). In another aspect, the set of requests can be stored in a computer readable memory system and sent to a computer readable memory subsystem (e.g., volatile and/or nonvolatile memory).

At 708, a memory system can read a BOT and SOT to check for a related request (e.g., BOT 404 and SOT 424). For example, a request can be issued to a memory system by a processor. The memory system can search a set of tables for entries. In one aspect, requests can be sent to a set of tables and an RQ, or to a set of tables then to RQ.

Turning to 712, a memory system can determine if a bank corresponding to a request is open (e.g., via BOT 404). If open, methodology 700 can proceed to 718. If closed, methodology 700 can proceed to 724.

At 718, a memory system can update statistical information in a BOT and update information in a RQ (e.g., BOT 404 and RQ 444). In one embodiment, a memory system updates information related to requests associated with an addressable memory bank indicated by the received requests.

At 724, a SOT can be read and checked for an entry related to an address of the received requests (e.g., by a SOT 424). In one aspect, an entry in the SOT can indicate a previous set of requests to a closed bank page, wherein the previous set of requests have not been serviced.

Turning to 728, a memory device can update statistical information held within a SOT and related information within a RQ (e.g., SOT 424, and RQ 444). For example, information relating to the number of received and unprocessed requests to a bank can be updated to reflect a new request to the bank. In one aspect, a new entry may be entered into a SOT to indicate a first request to a not opened bank. Thus, statistical information can be monitored and tracked via methodology 700.

With reference to FIG. 8, there is illustrated a methodology 800 for monitoring statistical information related to a multi-bank memory device, according to an aspect of this disclosure (e.g., via memory system 400). As an example, various electronic devices, such as, but not limited to, memory storage systems, server systems, personal computers, cellular phones, consumer electronic and other electronic systems can utilize methodology 800. Specifically, methodology 800 updates a set of tables with entries related to a request to be scheduled.

A memory system can begin to schedule requests (e.g., via SCH 316) at 802. For example, a scheduler component within an electronic device can begin to schedule requests contained in a request queue.

Turning to 812, a memory system can determine if a request is marked for a BOT or SOT request (e.g., via SOTID CAM 448 and BOTID CAM 452). For example, a memory system can determine an association between a request and a BOT or an SOT. The determination is used to send a request to the respective table.

At 818, a memory system can determine to issue a BOT marked request (e.g., via BOTID CAM 452). For example, a SCH can issue a BOT marked request and communicate with a BOT.

At 822, a memory system can determine to issue a SOT marked request (e.g., via SOTID CAM 448). For example, a SCH can issue a SOT marked request and communicate with a SOT.

Turning to 826, a memory system can check to see if a bank and/or bank page is open (e.g., via BOT 340). For example, a table look up can determine if a bank and/or bank page associated with a request is also associated with a BOT entry. In another example, a BOT can check the status of a bank and/or bank page.

At 828, a memory system can determine if a bank and/or bank page is not open (e.g., via BOT 340). For example, a SCH can issue a BOT marked request and communicate with a BOT, if a BOT lookup is a miss the bank and/or bank page is not open.

At 830, a memory system can determine if a bank and/or bank page is open (e.g., via BOT 340). For example, a SCH can issue a BOT marked request and communicate with a BOT, if a BOT lookup is a hit the bank and/or bank page is open.

Turning to 834, a bank and/or bank page is opened or scheduled to be opened (e.g., via MC 540) and a BOT is updated (e.g., BOT 340). For example, a not opened bank can be issued an activation command to open the bank. A BOT can create an entry corresponding to the newly opened bank and/or bank page. In one example, an SOT is updated to remove an SOT entry corresponding to the newly opened bank and/or bank page.

At 838, a BOT is updated to reflect a scheduled or processed request (e.g., updating BOT 340). In one aspect, data corresponding to the bank (and/or bank page) being scheduled is updated (e.g., a count of processed or serviced requests). In another aspect, statistical information relating to requests is updated.

Turning to 842, a memory system can check to see if a bank and/or bank page is open (e.g., via BOT 340). For example, a table look up can determine if a bank and/or bank page associated with a request is also associated with a BOT entry. In another example, a BOT can check the status of a bank and/or bank page.

At 846, a memory system can determine if a bank and/or bank page is open (e.g., via BOT 340). For example, a SCH can issue a BOT marked request and communicate with a BOT, if a BOT lookup is a hit the bank and/or bank page is open.

At 850, a memory system can determine if a bank and/or bank page is not open (e.g., via BOT 340). For example, a SCH can issue a BOT marked request and communicate with a BOT, if a BOT lookup is a miss the bank and/or bank page is not open.

At 854, a request to a not open bank is processed. For example, a bank can be opened, a SOT entry can be swapped to a BOT, statistical information can be updated, a SOT entry associated with the bank can be removed and added to a free list, and/or a memory request can be scheduled/.

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

Figure 9:
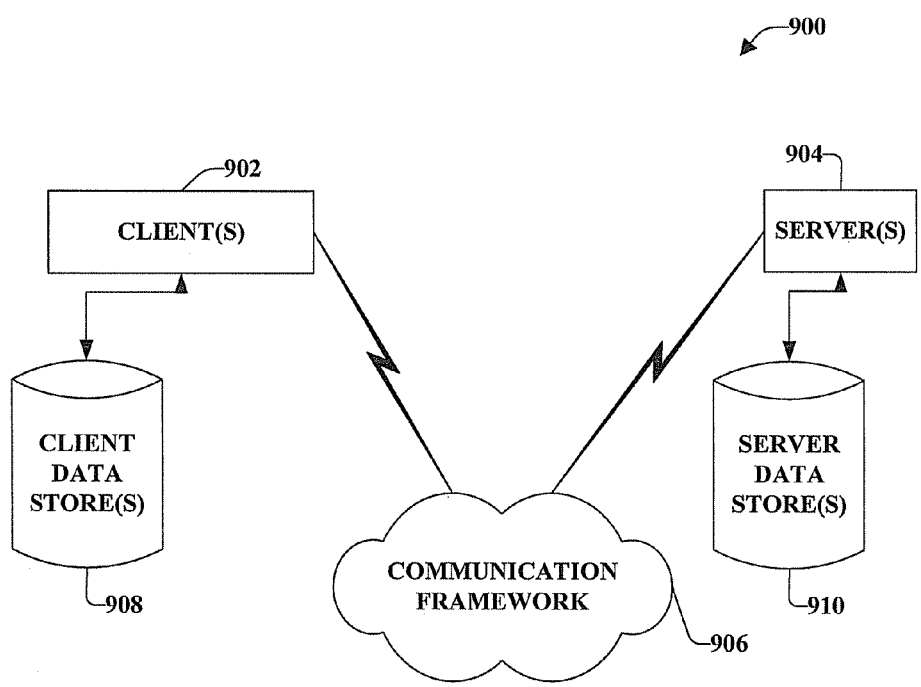
FIG. 9 illustrates an example schematic block diagram of a computing environment in accordance various aspects of this disclosure.

Referring now to FIG. 9, there is illustrated a schematic block diagram of a computing environment 900 in accordance with this specification. The system 900 includes one or more client(s) 902, (e.g., computers, smart phones, tablets, cameras, PDA's). The client(s) 902 can be hardware and/or software (e.g., threads, processes, computing devices). The client(s) 902 can house cookie(s) and/or associated contextual information. The client(s) 902 can include one more memory systems in accordance with aspects of this disclosure. For example, a client 902 can perform tasks and manage a multi-bank memory system.

The system 900 also includes one or more server(s) 904. The server(s) 904 can also be hardware or hardware in combination with software (e.g., threads, processes, computing devices). The server(s) 904 can house threads to perform transformations, for example. The server(s) 904 can also include various memory systems capable of identifying monitoring memory banks in accordance with this disclosure. One possible communication between a client 902 and a server 904 can be in the form of a data packet adapted to be transmitted between two or more computer processes wherein data may be accessed or stored in accordance with aspects of this disclosure. The data packet can include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

In one implementation, a client 902 can transfer data or requests to a server 904. Server 904 can store the data, perform requests, or transmit the data or request to another client 902 or server 904. At various stages, system 900 can implement memory systems in accordance with this disclosure. For example, the client(s) 902 and the server(s) 904 can each implement one or more memory systems in accordance with this disclosure.

Figure 10:
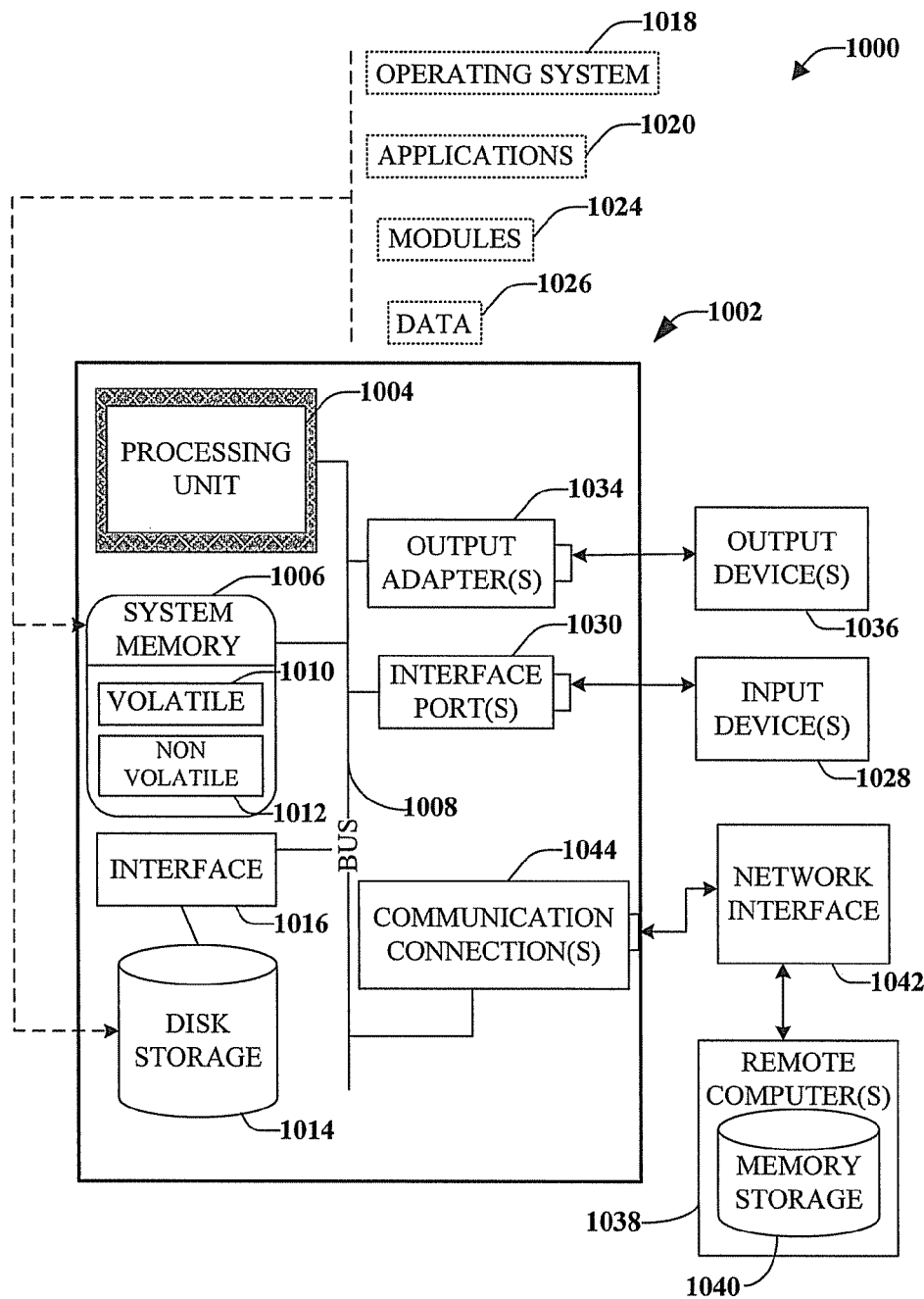
FIG. 10 illustrates an example block diagram of a computer operable to execute various aspects of this disclosure.

With reference to FIG. 10, a suitable environment 1000 for implementing various aspects of the claimed subject matter includes a computer 1002. The computer 1002 includes a processing unit 1004, a system memory 1006, and a system bus 1008. The system bus 1008 couples system components including, but not limited to, the system memory 1006 to the processing unit 1004. The processing unit 1004 can be any of various available processors. Dual microprocessors and other multiprocessor architectures also can be employed as the processing unit 1004.

The system bus 1008 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1006 can include volatile memory 1010 and non-volatile memory 1012. The basic input/output system (BIOS), containing the basic routines to transfer information between elements within the computer 1002, such as during start-up, is stored in non-volatile memory 1012. By way of illustration, and not limitation, non-volatile memory 1012 can include read only memory (ROM), programmable ROM (PROM), electrically programmable ROM (EPROM), electrically erasable programmable ROM (EEPROM), or flash memory. Volatile memory 1010 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDRx SDRAM), and enhanced SDRAM (ES-DRAM). Volatile memory 1010 can implement various aspects of this disclosure, including memory systems containing MASCH components.

Computer 1002 may also include removable/non-removable, volatile/non-volatile computer storage media. FIG. 10 illustrates, for example, a disk storage 1014. Disk storage 1014 includes, but is not limited to, devices like a magnetic disk drive, solid state disk (SSD) floppy disk drive, tape drive, Zip drive, LS-100 drive, flash memory card, or memory stick. In addition, disk storage 1014 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1014 to the system bus 1008, a removable or non-removable interface is typically used, such as interface 1016.

It is to be appreciated that FIG. 10 describes software, software in execution, hardware, and/or software in combination with hardware that acts as an intermediary between users and the basic computer resources described in the suitable operating environment 1000. Such software includes an operating system 1018. Operating system 1018, which can be stored on disk storage 1014, acts to control and allocate resources of the computer system 1002. Applications 1020 take advantage of the management of resources by operating system 1018 through program modules 1024, and program data 1026, such as the boot/shutdown transaction table and the like, stored either in system memory 1006 or on disk storage 1014. It is to be appreciated that the claimed subject matter can be implemented with various operating systems or combinations of operating systems. For example, applications 1020 and program data 1026 can include software implementing aspects of this disclosure.

A user enters commands or information into the computer 1002 through input device(s) 1028. Input devices 1028 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1004 through the system bus 1008 via interface port(s) 1030. Interface port(s) 1030 include, for example, a serial port, a parallel port, a game port, and a universal serial bus (USB). Output device(s) 1036 use some of the same type of ports as input device(s) 1028. Thus, for example, a USB port may be used to provide input to computer 1002, and to output information from computer 1002 to an output device 1036. Output adapter 1034 is provided to illustrate that there are some output devices 1036 like monitors, speakers, and printers, among other output devices 1036, which require special adapters. The output adapters 1034 include, by way of illustration and not limitation, video and sound cards that provide a means of connection between the output device 1036 and the system bus 1008. It should be noted that other devices and/or systems of devices provide both input and output capabilities such as remote computer(s) 1038.

Computer 1002 can operate in a networked environment using logical connections to one or more remote computers, such as remote computer(s) 1038. The remote computer(s) 1038 can be a personal computer, a server, a router, a network PC, a workstation, a microprocessor based appliance, a peer device, a smart phone, a tablet, or other network node, and typically includes many of the elements described relative to computer 1002. For purposes of brevity, only a memory storage device 1040 is illustrated with remote computer(s) 1038. Remote computer(s) 1038 is logically connected to computer 1002 through a network interface 1042 and then connected via communication connection(s) 1044. Network interface 1042 encompasses wire and/or wireless communication networks such as local-area networks (LAN), wide-area networks (WAN), and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1044 refers to the hardware/software employed to connect the network interface 1042 to the bus 1008. While communication connection 1044 is shown for illustrative clarity inside computer 1002, it can also be external to computer 1002. The hardware/software necessary for connection to the network interface 1042 includes, for exemplary purposes only, internal and external technologies such as, modems including regular telephone grade modems, cable modems and DSL modems, ISDN adapters, wired and wireless Ethernet cards, hubs, and routers.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described herein can include electrical circuit(s) that can include components and circuitry elements of suitable value in order to implement the implementations of this innovation(s), optical devices, and/or mechanical devices in order to implement the implementations of this innovation(s). Furthermore, it can be appreciated that many of the various components can be implemented on one or more integrated circuit (IC) chips. For example, in one implementation, a set of components can be implemented in a single IC chip. In other implementations, one or more of respective components are fabricated or implemented on separate IC chips.

What has been described above includes examples of the implementations of the present invention. It is, of course, not possible to describe every conceivable combination of components or methodologies for purposes of describing the claimed subject matter, but it is to be appreciated that many further combinations and permutations of this innovation are possible, including various systems and methods employing memory bank systems and/or methods. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

In addition, while a particular feature of this innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

Reference throughout this specification to "one implementation" or "an implementation" or "one embodiment" or "an embodiment" means that a particular feature, structure, or characteristic described in connection with the implementation is included in at least one implementation or at least one embodiment. Thus, the appearances of the phrase "in one implementation" or "in an implementation" or "in one embodiment" or "in an embodiment" in various places throughout this specification are not necessarily all referring to the same implementation/embodiment. Furthermore, the particular features, structures, or characteristics may be combined in any suitable manner in one or more implementations/embodiments.

Further, references throughout this specification to an "item," or "file," means that a particular structure, feature or object described in connection with the implementations are not necessarily referring to the same object. Furthermore, a "file" or "item" can refer to an object of various formats.

As used in this application, the terms "component," "module," "system," or the like are generally intended to refer to a computer-related entity, either hardware (e.g., a circuit), a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. While separate components are depicted in various implementations, it is to be appreciated that the components may be represented in one or more common component. Further, design of the various implementations can include different component placements, component selections, etc., to achieve an optimal performance. Further, a "device" can come in the form of specially designed hardware; generalized hardware made specialized by the execution of software thereon that enables the hardware to perform specific function (e.g., data storage and retrieval); software stored on a computer readable medium; or a combination thereof.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A system for managing requests to data banks in a computer memory, said system comprising:
    a bank page manager comprising:
        a bank open table (BOT) configured to manage requests associated with open data banks in said computer memory; and
        a scheduled open table (SOT) configured to manage requests associated with closed data banks in said computer memory;
    a request queue in communication with said bank page manager and configured to store requests that are marked as either a BOT request or a SOT request, wherein a BOT request is associated with an open data bank, and a SOT request is associated with a closed data bank; and
    a scheduler in communication with said request queue and configured to schedule said BOT request and said SOT request to said data banks.

2. The system of claim 1, wherein said bank page manager is further configured to generate statistical data associated with said requests.

3. The system of claim 2, wherein said bank page manager is further configured to generate said statistical data based on at least one of a count of requests associated with a memory address of said computer memory or a time period associated with respective requests of said requests.

4. The memory system of claim 2, wherein the scheduler is further configured to schedule said requests based in part on said statistical data.

5. The memory system of claim 1, wherein the request queue further comprises:
    a first table configured to store read request; and
    a second table configured to store write request, wherein said read request and said write request are marked as either a BOT request or a SOT request.

6. The memory system of claim 1, further comprising a computer processor in communication said bank page manager and configured to generate computer implementable instructions.

7. The system of claim 1, wherein the computer memory comprises a double data rate X (DDRX) device, wherein X represents a generation of DDR device.

8. The system of claim 1, wherein said bank page manager is further configured to mark, in response to said request queue receiving a new request, said new request as a BOT request or a SOT request based on at least one of entries of said BOT or said SOT.

9. The memory system of claim 1, wherein the bank page manager is further configured to convert, in response to activating a data bank of said data banks, SOT requests associated with said data bank to BOT requests.

10. The memory system of claim 1, wherein the bank page manager is further configured to convert, in response to deactivating a data bank of said data banks, BOT requests associated with said data bank to SOT requests.

11. A method for managing requests to data banks in a computer memory, said method comprising:
    employing a processor coupled to said data banks and configured for executing instructions stored in a tangible medium, to perform the following acts:
        monitoring data bank statuses of said data banks;
        maintaining, as a function of said data bank statuses,
            a bank open table (BOT) configured to manage requests associated with data banks with an open status in said computer memory; and
            a scheduled open table (SOT) configured to manage requests associated with data banks having a closed status in said computer memory;
        storing, in a request queue, requests that are marked either a BOT request or a SOT request, wherein a BOT request is associated with an open data bank, and a SOT request is associated with a closed data bank; and
        scheduling said BOT request and said SOT request to said data banks.

12. The method of claim 11, wherein scheduling said BOT request and said SOT request to said data banks, further comprises scheduling said BOT request and said SOT request requests as a function of statistical information associated with said requests stored in said request queue.

13. The method of claim 12, wherein said acts further comprise:
    updating said statistical information in response to at least one of the scheduling or processing a request of said requests.

14. The method of claim 12, wherein said acts further comprise:
    generating said statistical information as at least one of:
        a count of requests to respective data banks of said data banks,
        a count of not serviced request to said respective data banks,
        starvation information associated with said requests stored in said request queue,
        a count of read requests to said respective data banks, and
        a count of write requests to said respective data banks.

15. The method of claim 11, wherein monitoring said bank statuses further comprises determining a status associated with a page of a data bank of said data banks based on determining whether said page is open or closed, and, determining whether a request of said requests stored in said request queue is associated with said page.

16. The method of claim 11 further comprising:
    activating a data bank, associated with a SOT request, of said data banks; and
    marking SOT requests associated with said data bank as BOT requests.

17. A system for managing requests to data banks of a computer memory, said system comprising:
    means for monitoring data bank statuses of said data banks;
    means for maintaining:
        a bank open table (BOT) configured to manage requests associated with open data banks; and
        a scheduled open table (SOT) configured to manage requests associated with closed data banks in said computer memory;
    means for storing said requests as either a BOT request or a SOT request, wherein a BOT request is associated with a data bank having an open status, and a SOT request is associated with a data bank having a closed status; and
    means for scheduling said BOT request and said SOT request.

18. The system of claim 17 further comprising:
    means for generating statistical information, based at least in part on said data bank statuses, related to said requests.

19. The system of claim 18 wherein said means for scheduling said BOT request and said SOT request comprises means for scheduling, based on said statistical information, said BOT request and said SOT request.

20. The system of claim 18, further comprising:
means for updating, in response to receiving a new memory access request, at least one of said BOT or said SOT.

* * * * *